United States Patent [19]

Carbrey

[11] 3,787,630

[45] Jan. 22, 1974

[54] TIME DIVISION COMMUNICATION SYSTEM

[75] Inventor: Robert Lawrence Carbrey, Boulder, Colo.

[73] Assignee: Bell Telephone Laboratories Incorporated, Murray Hill, N.J.

[22] Filed: July 31, 1972

[21] Appl. No.: 276,896

[52] U.S. Cl. .... 179/15 AT, 179/18 BC, 179/15 AA

[51] Int. Cl. .... H04j 3/02

[58] Field of Search .........179/15 A, 15 AT, 15 AA, 179/15 AQ, 1 CN, 18 BC

[56] References Cited

UNITED STATES PATENTS

| | | | |
|---|---|---|---|
| 2,936,338 | 5/1960 | James | 179/15 AA |
| 3,617,643 | 11/1971 | Nordquist | 179/15 AQ |
| 3,233,043 | 2/1966 | Shimasaki | 179/15 AA |
| 3,469,255 | 9/1969 | Hoffman | 179/15 AA |
| 3,745,253 | 7/1973 | Carbrey | 179/15 AT |
| 3,742,147 | 6/1973 | Carbrey | 179/15 AT |
| 3,745,256 | 7/1973 | Carbrey | 179/15 AT |

*Primary Examiner*—Kathleen H. Claffy
*Assistant Examiner*—Thomas D'Amico
*Attorney, Agent, or Firm*—J. S. Cubert

[57] ABSTRACT

A time division communication system wherein a plurality of time slots occurs in repetitive cycles includes a plurality of stations, first and second buses, a control signal source and a coupling circuit operative in each time slot to sum all signals applied to the second bus and to apply the resultant signal to the first bus. Each station has an associated circuit including first, second and third stores. The first bus signal is applied to the first store in response to the control signal. The first store signal is couple via a first coupler to the second store and via a second coupler to the station and the third store. The third store also receives the station outgoing signal. In response to the control signal, the second and third stores are disconnected from the first and second couplers; the second and third stores are connected series opposing; and the station outgoing signal from the third store is applied to the second bus and the first store wherein it is subtracted from the first bus signal. The control signal is applied to the selected station circuits in a distinct time slot whereby signals are exchanged among the selected stations.

22 Claims, 6 Drawing Figures

TIME DIVISION COMMUNICATION SYSTEM

BACKGROUND OF THE INVENTION

My invention relates to communication systems and more particularly to information transfer arrangements in a time division communication system.

Time division communication systems permit a plurality of information exchanges over a common communication link. Each exchange is assigned to a particular time slot of a repetitive group of time slots. During the repetitive time slot group, a plurality of information sample exchanges are sequentially completed over the common link. In one such time slot, the information from each line assigned to the connection is sampled and the sample is transferred to the other assigned lines via the common link. The common link is available to other line connections during the remaining time slots of the repetitive time slot cycle. As is well known in the art, the sampling rate for the line connections may be selected to provide an accurate information transfer between selectively interconnected lines. Where the sampling rate is periodic and greater than twice the highest frequency to be transferred, the signal transmission may be without loss.

In some prior art time division communication systems, a resonant transfer between a pair of line associated storage devices is utilized to accomplish the information exchange in a distinct time slot. This type of transfer requires a relatively precise network for the information exchange which network includes inductive elements and the line associated storage capacitors. The inductive element and the storage capacitors must be specially selected for precisely timed signal transfers. Since the energy exchanged in each time slot is limited to a small time sample of the signal, a relatively large amount of power is needed for each exchange, and only a small portion of the energy transferred by means of resonant transfer lies within the desired frequency range. Thus, the electronic switches interconnecting the selected lines in a time slot must have very low losses and must be precisely timed. Additionally, the conversion of the exchanged information from sampled form to analog signals requires a complex filter associated with each line storage device to provide maximum transfer of the limited energy available in the desired band.

In other time division signal transfer systems, a smaple signal from a first storage device is transferred directly to a second storage device wherefrom the stored sample is made available for an extended period of time. Advantageously, this sample and hold switching arrangement provides a larger signal component in the desired band so that the filter requirements are simplified and, further, inductive elements are eliminated in the transfer network. But, the sample and hold technique has generally required at least two distinct time intervals to complete the signal transfer between a pair of lines. Other forms of sample and hold time division transfer systems such as illustrated in my copending U.S. Pat. application Ser. No. 224,780, filed Feb. 9, 1972, now U.S. Pat. No. 3,745,253 provide a signal transfer between a pair of lines on a time division basis in a single time interval. These arrangements, however, require the use of three or more time division buses and are limited to signal transfers between a single pair of lines in each time slot.

SUMMARY OF THE INVENTION

My invention is a time division communication system wherein a plurality of time slots occurs in repetitive cycles that includes a plurality of communication paths, first and second common buses, a control signal source and a coupling circuit operative during a distinct time slot to sum all signals applied to the second bus and to apply the resultant sum signal to the first bus. Each communication path has an associated circuit which includes first, second and third stores. In the distinct time slot assigned to a call connection, the signal from the first common bus is applied to the first store responsive to a control signal being applied to the associated circuit. The first store signal is coupled via a first coupler to the second store and is further coupled from the first coupler via a second coupler to the communication path and the third store. The third store is also connected to the associated communication path whereby both the path outgoing signal and the first store signal are stored therein. In response to the control signal being applied to the associated circuit, the second and third stores are connected series opposing so that only the communication path outgoing signal appears across the serially connected stores. The output of the series connected second and third stores is coupled to the second common bus. In this manner, only the communication path outgoing signal from the third store is applied to the second bus. The control signal is applied to a plurality of selected path circuits whereby signals are exchanged among the selected communication paths during a single time interval.

According to one aspect of the invention, the output of the serially connected second and third stores is also applied to the first store which is operative during the distinct time slot to subtract the communication path outgoing signal from the first bus signal. In this way, the associated communication path receives only the signals from the other selected paths.

According to another aspect of the invention, the first coupler is connected to the second store via at least one normally closed switch and the second store is connected to the second coupler via a pair of normally closed switches. The first store is connected between the first and second buses via a pair of normally open switches and the second and third stores are interconnected by a plurality of normally open switches. Each normally closed switch is opened in response to the control signal during the distinct time slot, and each normally open switch is closed in response to said control signal whereby the second and third stores are disconnected from the first and second couplers and are serially connected. The output from the serially connected stores is applied to the second bus. Advantageously, each switch may comprise an insulated gate field effect transistor (IGFET) having a source-drain path and a gate electrode responsive to the application of the control signal in the distinct time slot to reverse the conductive state of the associated IGFET source drain path.

According to another aspect of the invention, each communication path has an associated recirculating shift register adapted to control the operation of the communication path circuit. The control signal source provides a signal in an assigned time slot of one repetitive cycle to each selected path recirculating shift register. Each recirculating shift register in turn applies control signals to the communication path circuit during the assigned time slot of each succeeding repetitive cycle for the duration of the connection. In this way, the selected communication path circuits are enabled in the assigned time slot to received the signals from the other paths and to transmit each outgoing path signal whereby information is exchanged among the communication paths of the connection during the assigned time slot.

In one embodiment illustrative of my invention, each of the first, second and third stores of a communication path circuit comprises a storage capacitor, and the first coupler comprises an IGFET amplifier having equal and opposite phase outputs. One terminal of the first storage capacitor is connected to the first bus via a normally open IGFET switch and is further connected to the gate electrode of the first IGFET amplifier. The second storage capacitor is connected btween the source and drain electrodes of the first IGFET amplifier via a pair of normally closed IGFET switches. The second coupler comprises second and third IGFET amplifiers, the second IGFET amplifier gate electrode being connected to the first IGFET amplifier drain electrode and the third IGFET amplifier gate electrode being connected to the first IGFET amplifier source electrode. The drain electrode of the second IGFET amplifier is directly connected to one conductor of the associated communication path and is further connected to one terminal of the third storage capacitor via a normally closed IGFET switch. The drain electrode of the third IGFET amplifier is connected to the other communication path conductor and is further connected to the other third storage capacitor terminal via another normally closed IGFET switch. The first storage capacitor signal is coupled to the second storage capacitor via the first IGFET amplifier and the same signal is applied to the third storage capacitor via the second and third IGFET amplifiers.

During the distinct time slot, all normally closed IGFET switches are opened responsive to the control signal whereby the second and third storage capacitors are disconnected from the IGFET amplifier arrangement. These capacitors are connected series opposing via a plurality of normally open IGFET switches which are closed in response to the control signal. The output of the series connected second and third storage capacitors is coupled via a fourth IGFET amplifier and another now closed normally open IGFET switch to the second common bus and is further applied to the first storage capacitor from the output of the fourth IGFET amplifier. In this way, in response to the control signal during the distinct time slot, the outgoing signals from a plurality of selected communication path circuits are applied to the second bus. A summing amplifier connected from the second bus to the first bus sums the selected outgoing communication path circuit signals and applies the resultant sum signal to the first bus. The sum signal is further applied to the first storage capacitor of each selected path circuit via a now closed normally open IGFET switch. In this manner, each selected communication path circuit first storage capacitor stores the sum of the communication path signals less the signal from the associated communication path during the distinct time slot.

In another embodiment illustrative of my invention, each communication path circuit comprises first, second and third storage capacitors and a first IGFET amplifier having equal and opposite phase outputs. One terminal of the first storage capacitor is connected to the first bus via a normally open IGFET switch and is also connected to the gate electrode of the first IGFET amplifer. The second storage capacitor is connected to the drain electrode of the first IGFET amplifier via a normally closed IGFET switch. A second amplifier comprises first and second opposite polarity transistors, the first transistor base being connected to the first IGFET amplifier drain electrode and the second transistor base being connected to the first IGFET amplifier source electrode. The emitter of the first transistor is connected to one conductor of the associated communication path via an impedance and is further connected to one terminal of a second storage capacitor via a normally closed IGFET switch. The emitter of the second transistor is connected to the other communication path conductor via an impedance and is further connected to the other second storage capacitor terminal via another normally closed IGFET switch. The output signal from the first storage capacitor is coupled to the second storage capacitor via the first IGFET amplifier and said first storage capacitor signal also applied to the communication path and the third storage capacitor via the first and second transistors.

During the distinct time slot, the normally closed IGFET switches are opened responsive to a control signal whereby the second and third storage capacitors are disconnected from the first and second amplifiers. The storage capacitors are then serially connected via a pair of normally open IGFET switches which are closed during the distinct time slot in response to the control signal. The output of the series connected second and third storage capacitors is coupled via a third IGFET amplifier and another now-closed, normally open IGFET switch to the second common bus; and the output of the third IGFET amplifier is also applied to the first storage capacitor.

The control signal is applied to the plurality of selected communication path circuits during the distinct time slot whereby the signals from the selected communication paths are coupled to the second bus. A summing amplifier connected from the second bus to the first bus sums the selected outgoing communication path signals and applies the resultant sum signal to the first bus. The first bus sum signal is applied to the first storage capacitor of each selected path circuit via a normally open now closed IGFET switch connected to the first storage capacitor. In this way, signals are exchanged among the selected communication paths.

In another embodiment illustrative of my invention, each communication path circuit includes first, second and third storage capacitors. One terminal of the first storage capacitor is connected to the first bus via a normally open switch. The first storage capacitor one terminal is coupled to the second storage capacitor and an IGFET amplifier is employed to couple the output of the second storage capacitor to each conductor of the communication path via a resistive network. The IGFET amplifier gate electrode is connected to the second storage capacitor, the drain electrode of the IGFET amplifier is coupled to one conductor of the communication path and is further coupled to one terminal of the third storage capacitor. The source electrode of the IGFET amplifier is coupled to the other conductor of the communication path and is further coupled to the other terminal of the third storage capacitor. In this way, equal and opposite phase signals corresponding to the signal stored in the first storage capacitor are applied to the associated communication path and to the third storage capacitor.

During the distinct time slot, the second and third storage capacitors are serially connected via a pair of normally open switches and the communication path outgoing signal in the series connected third storage capacitor is coupled via a second IGFET amplifier to the second bus through a normally open switch. The path outgoing signal is further applied to the other terminal of the first storage capacitor. The control signal is applied to a plurality of selected communication path circuits whereby the selected communication path signals are coupled to the second bus in the distinct time slot. A summing amplifier connected from the second bus to the first bus sums the selected outgoing communication path circuit signals and applies the resulting sum signal to each selected circuit first storage capacitor. In this manner, signals are exchanged among the selected communication path circuits during the distinct time slot.

DETAILED DESCRIPTION

Figure 1:
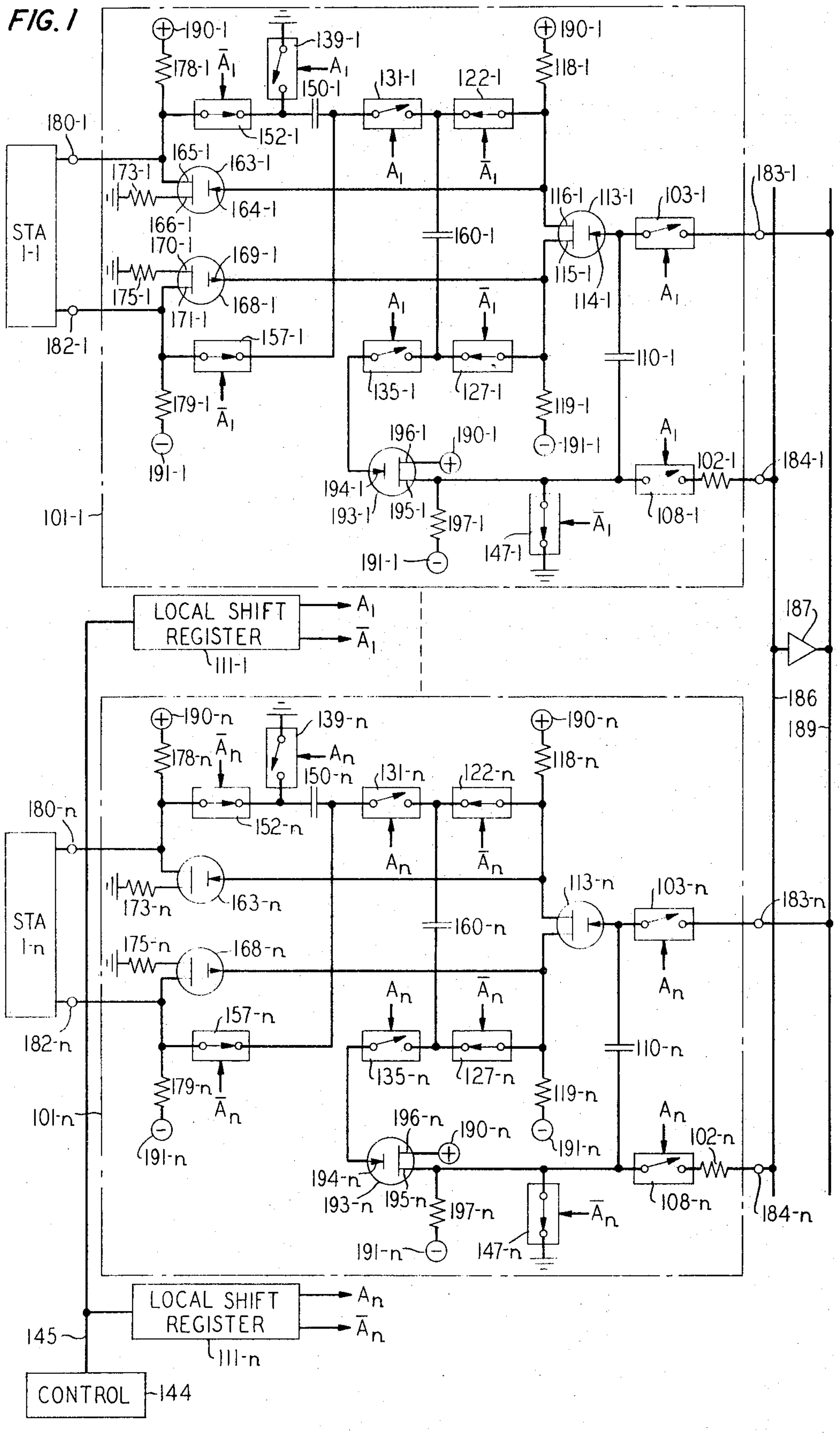
FIG. 1 depicts a time division communication system in accordance with an embodiment of my invention.

FIG. 1 shows a time division communication system including stations 1—1 through 1–*n*, station circuits 101–1 through **101–*n*, common buses 186 and 189, summing network 187, control 144 and shift registers 111–1 through 111–*n*. Station circuit 101–1 is connected to station 1—1 via terminals 180–1 and 182–1, and is also connected to common buses 186 and 189 via terminals 184–1 and 183–1 respectively. Similarly station circuit 101–*n*** is connected to station 1–*n* via terminals **180–*n* and 182–*n* and is further connected to buses 186 and 189 via terminals 184–*n* and 183–*n*** respectively.

Figure 5:
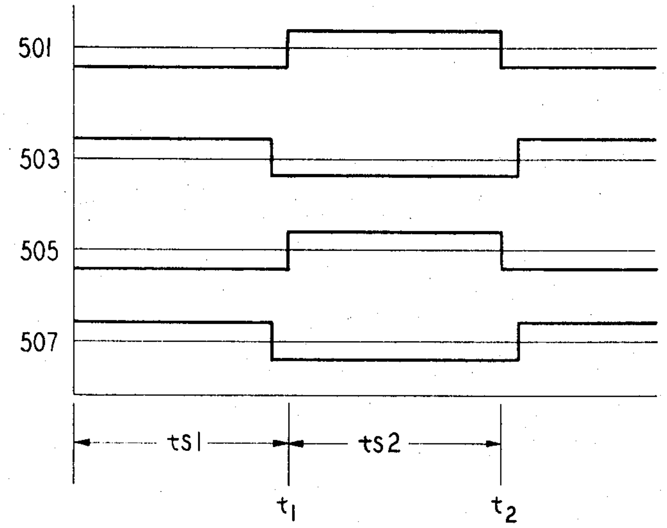
FIG. 5 shows waveforms useful in illustrating the operation of the time division communication of FIG. 1.

Assume for purposes of illustration that station 1—1 is connected to station 1–*n* during a distinct time slot such as time slot *ts*2 in FIG. 5 and that signals are exchanged between these connected stations via the time division communication arrangements of FIG. 1 during this time slot. It is to be understood that the arrangements of FIG. 1 are not limited to a signal exchange between two stations but that signals may be exchanged among more than two stations during a single time slot. During time slot *ts*2 in a repetitive time slot cycle prior to the cycles in which the signal exchanges take place, control 144 provides a signal to both shift registers 111–1 and **111–*n* via cable 145.** This signal is stored in each of these shift registers and recirculated therein as subsequently described with respect to FIG. 6. In this way, a pair of control signals is obtained from each shift register in time slot *ts*2 of each of the succeeding repetitive cycles. Shift register 111–1 provides a signal $\underline{A}1$ illustrated in waveform 501 of FIG. 5 and a signal $\bar{A}1$ illustrated in waveform 503 of FIG. 5 to control the operation of station circuit 101–1. Shift register **111–*n* provides signals An and $\bar{A}$n to control the control the operation of station circuit 101–*n*** in time slots *ts*2. These signals are illustrated in waveforms 505 and 507 respectively.

Assume that a signal *el–n* has been previously stored in store 110–1. The signal from one terminal of storage capacitor 110–1 is applied to gate 114–1 of IGFET amplifier 113–1. IGFET amplifier 113–1 is an enhancement type device. Drain electrode 116–1 is connected to positive voltage source 190–1 via impedance 118–1 and source electrode 115–1 is connected to negative voltage source 191–1 via impedance 119–1. Impedances 118–1 and 119–1 are equal. Normally closed switch 147–1 is connected between the other terminal of capacitor 110–1 and a ground reference potential. Switch 147–1 provides a reference bias for gate electrode 114–1 except during time slot *ts*2. As is well known in the art in response to the signal *el–n* applied to gate electrode 114–1 the signal *–el–n* appears on drain electrode 116–1 and the opposite phase signal *el–n* appears on source electrode 115–1. Normally closed switch 122–1 is connected between drain electrode 116–1 and one terminal of storage capacitor 160–1 so that the signal *–el–n* is applied thereto. Normally closed IGFET switch 127–1 is connected between source electrode 115–1 and the other terminal of storage capacitor 160–1 whereby the signal *el–n* is applied to said other terminal. In this way, capacitor 160–1 stores a signal equal to –2*el–n*.

The signals from the source and drain electrodes of amplifier 113–1 are coupled to station 1—1 via opposite polarity IGFET amplifiers 163–1 and 168–1. IGFET 163–1 is an n enchancement device well-known in the art and IGFET 168–1 is a *p* depletion device well-known in the art. Opposite polarity IGFETs are used in this coupling arrangement to advantageously provide a balanced signal to station 1—1 via terminals 180–1 and 182–1 at proper bias levels for the operation of station 1—1. Drain electrode 165–1 is connected to positive voltage source 190–1 via impedance 178–1. Source electrode 166–1 is connected to ground reference potential via impedance 173–1 so that IGFET 163–1 is properly biased for linear operation. Drain electrode 171–1 is connected to negative voltage source 191–1 via impedance 179–1 and source electrode 170–1 is connected to ground reference potential via impedance 175–1 whereby IGFET amplifier 168–1 is appropriately biased for linear operation. Gate electrode 164–1 receives the signal *–el–n* from drain electrode 116–1 and in accordance with the principles of IGFET amplifier operation, the signal *el–n* appears at drain electrode 165–1 and this signal is transferred to station 1—1 via terminal 180–1. Gate electrode 169–1 receives the signal *el–n* from source electrode 115–1 so that the signal *–el–n* appears at drain electrode 171–1 wherefrom it is transferred to station 1—1 via terminal 182–1. In this way, the signal stored in capacitor 110–1 results in a corresponding balanced signal being sent to station 1—1. One terminal of storage capacitor 150–1 is connected to drain 165–1 via normally closed switch 152–1 and the other terminal of storage capacitor 150–1 is connected to drain 171–1 via normally closed switch 157–1. In this way, storage capacitor 150–1 stores both the signal 2*el–n* and *el*–l, the outgoing signal from station 1—1.

During each *ts*2 time slot, shift register 111–1 provides positive going control signal A1 (waveform 501) and negative going control signal $\bar{A}1$ (waveform 503). Control signal $\bar{A}1$ is applied to each of normally closed switches 122–1, 127–1, 152–1, 157–1 and 147–1 whereby these switches are opened during each *ts*2 time slot. In this way, storage capacitor 160–1 is disconnected from the outputs of IGFET amplifier 113–1 and storage capacitor 150–1 is disconnected from the outputs of amplifiers 163–1 and 168–1 and from terminals 180–1 and 182–1. Normally open switches 103–1, 108–1, 139–1, 131–1 and 135–1 are closed in response to control signal A1. Storage capacitors 150–1 and 160–1 are connected series opposing during time slot *ts*2 via switches 139–1, 131–1 and 135–1. Normally open switch 135–1 is connected to gate electrode 194–1 of *n* enhancement type IGFET amplifier 193–1. The signal applied to gate electrode 194–1 is *el–l*, the outgoing signal from station 1—1. Since capacitors 150–1 and 160–1 are connected series opposing, the signal stored therein is 2*el–n* – [2*el–n*] + *el–l* whereby the resulting signal *el–l* is applied to gate electrode 194–1. Amplifier 193–1 is connected as a source follower well known in the art. Drain electrode 196–1 is directly connected to positive voltage source 190–1, and source electrode 195–1 is connected to negative voltage source 191–1 via impedance 197–1. This biasing arrangement allows linear operation of the source follower so that signal *el–l* somewhat attenuated appears on source 195–1. This signal is coupled to one terminal of storage capacitor 110–1 and is further coupled to common bus 185 during time slot *ts*2 via switch 108–1, impedance 102–1, terminal 184–1.

Station circuit **101–*n* operates in a substantially similar manner to that of station circuit 101–1. The signal stored in capacitor 110–*n*** is *el–l.* This signal is transferred to station **1–*n* via the coupling arrangement including IGFET amplifiers 113–*n*, 163–*n* and 168–*n*.** The signal –2*el–l* is stored in storage capacitor **160–*n* through the operation of IGFET amplifier 113–*n*** and signal 2*el–l* as well as *el–n* corresponding to the outgoing signal from station **1–*n* is stored in storage capacitor 150–*n* through the operation of IGFET amplifiers 163–1 and 168–1.** Thus, during time slot *ts*2, the signal *el–n* stored in capacitor **150–*n* is applied to common bus 186 via series connected capacitors 150–*n* and 160–*n* through the coupling arrangement including IGFET source follower 193–*n*, switch 108–*n*, impedance 102–*n* and terminal 184–*n* in response to control signals An and $\bar{A}$n from shift register 111–*n*.**

The signals from the selected stations 1—1 and **1–*n* applied to common bus 186 are summed in summing curcuit 187** and the resultant sum signal *el–l* and *el–n* is applied to common bus 189. Since normally open switch 103–1 is closed during time slot *ts*2 in response to control signal A1, the resultant sum signal is applied to the terminal of storage capacitor 110–1 connected to switch 103–1 and the signal *el–l* from IGFET amplifier 193–1 is applied to the other terminal of storage capacitor 110–1. The resultant signal stored in capacitor 110–1 is *el–n.* Similarly, the resultant signal stored in capacitor **110–*n*** is *el–l.* In this way, signals are exchanged between station circuits 101–1 and **101–*n*** during time slot *ts*2. Signal *el–l* in storage capacitor 110–1 is then coupled to station 1—1 as hereinbefore described and signal *el–l* in capacitor **110–*n* is coupled to station 1–*n*** in a similar manner.

As can readily be seen, three or more stations in FIG. 1 may be interconnected during time slot *ts*2 under control of the shift registers associated therewith whereby the sum of the signal outputs from the selected stations is obtained from summing circuit 187 during time slot *ts*2. When the sum signal is returned to each station circuit, the contribution of the associated station is removed and the remaining signal which consists of the sum of all other selected station signals is coupled to the connected station. In this manner, signals are exchanged among three or more stations in a distinct time slot whereby a conference hookup is maintained. If stores 110–1 through **110–*n* are not connected to the source electrode of IGFET amplifiers 193–1 through 193–*n*,** respectively, the associated station contribution is not removed from the sum signal so that the entire sum signal is coupled to the associated station.

Both d.c. and voice signals are transferred from station 1—1 to capacitor 150–1. When station 1—1 changes hook state, there is a distinct d.c. voltage shift which is stored in capacitor 150–1 and is transferred therefrom to common bus 186 during a selected time slot. Thus, an indication of hook status can be obtained on bus 186 for use in the control of call connections.

Figure 2:
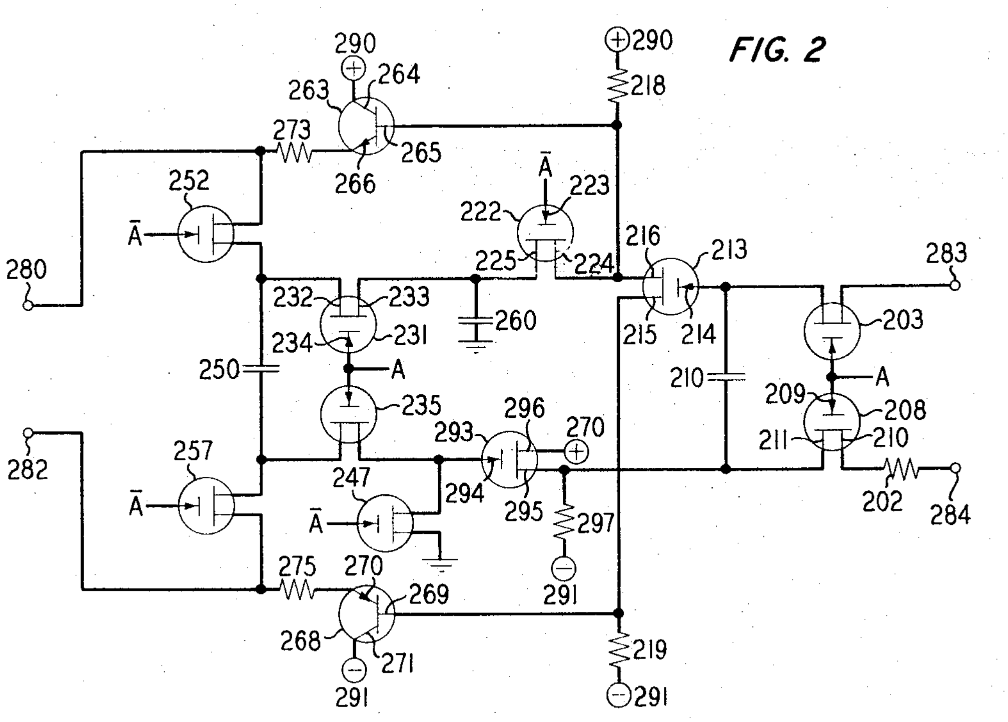
FIG. 2 shows a communication path circuit that may be used in the system of FIG. 1.

FIG. 2 shows a schematic diagram of a station circuit that may be used as any of station circuits 101–1 through **101–*n* such as station circuit 101–1 in the diagram of FIG. 1. Capacitor 210 then corresponds to store 110–1, capacitor 260 corresponds to store 160–1 and capacitor 250 corresponds to store 150–1. The switches controlled by control signals A1 and $\bar{\mathbf{A}}\mathbf{1}$ in FIG. 2 are insulated gate field effect transistors. The IGFET switches in FIG. 2** are all of the *n* enhancement type, well known in the art, but it is to be understood that other types of IGFET devices or switching devices may be used. IGFET 208 selectively connects one terminal of capacitor 210 to terminal 284 via impedance 202. During the distinct time slot, control signal A1 is positive as shown in waveform 501 and this positive signal is applied to gate electrode 209. In response to the positive signal on gate electrode 209, a conductive path is established between source electrode 210 and drain electrode 211 of IGFET 208. Control signal A1 is made more positive than the largest expected positive signal applied to either source electrode 210 or drain electrode 211 so that IGFET switch 208 is maintained in a conductive state responsive to positive control signal A. Thus, a bidirectional path is provided through the source-drain path of IGFET 208 as long as control signal A1 is sufficiently positive. When control signal A is negative, the source-drain path of IGFET 208 is rendered nonconductive. The negative excursion of the control signal must be greater than the largest expected negative signal appearing on either the source or drain electrodes of IGFET 208 so that the nonconductive state of the source-drain path is properly maintained in the interval between successive *ts*2 time slots. Control signal A is applied to each of normally open IGFET switches 203, 208, 231 and 235 so that these switches are conductive only during the selected time slot, e.g., time slot $ts2$.

Normally closed IGFET switches 222, 252 and 257 receive control signal $\bar{A}1$ at their gate electrodes. This control signal is shown in waveform 503 and is positive at all times except during the selected time slot $ts2$. Thus, the switches are in the nonconductive state only during time slot $ts2$. The negative excursion of control signal $\bar{A}1$ is selected to be greater than the largest expected negative signal applied to the source and drain electrodes of the associated normally closed switches so that the source-drain paths remain in the nonconductive state during time slot $ts2$. At all other times, the positive excursion of control signal $\bar{A}1$ must be greater than the largest expected positive signals on the associated source and drain electrodes whereby the source-drain paths are maintained in the conductive state.

Assume for purposes of illustration that storage capacitor 210 contains the signal $el\text{–}n$ prior to time slot $ts2$. Since control signal $\bar{A}1$ is positive at this time, the source-drain path of IGFET 222 as well as the source drain paths of IGFETs 247, 252 and 257 are conducting. Gate electrode 214 of IGFET amplifier 213 receives the stored signal $el\text{–}n$ from one terminal of capacitor 210. The other terminal of capacitor 210 is connected to source electrode 295 of source follower 293. Since normally closed IGFET switch 247 is connected to ground reference potential in response to control signal $\bar{A}$, a reference potential for capacitor 210 and gate electrode 214 is obtained at source electrode 295. This reference potential provides an appropriate biasing point for gate electrode 215.

Drain electrode 216 of IGFET 213 is connected to positive source 290 via impedance 218 and source electrode 215 is connected to negative voltage source 291 through impedance 219. This arrangement provides a biasing path for IGFET 213 whereby this IGFET operates in its linear range. As is well known in the art, IGFET 213 is operative in response to the signal $el\text{–}n$ applied to gate electrode 214 to provide a signal $el\text{–}n$ on drain electrode 216 and a signal $el\text{–}n$ on source electrode 215. Drain electrode 216 is connected to storage capacitor 260 via normally closed IGFET switch 222. At this time prior to time slot $ts2$, control signal $\bar{A}1$ is positive so that a conductive path is provided between drain electrode 216 and one terminal of capacitor 260. In this way, the signal $-el\text{–}n$ is stored in capacitor 260.

Opposite polarity transistors 263 and 268 are operative to couple the output signals from IGFET amplifier 213 to terminals 280 and 282. Transistor 263 is a NPN transistor, well known in the art, and transistor 268 is a PNP transistor, well known in the art. Collector 264 is connected to positive source 290 and emitter 266 is connected to terminal 280 via impedance 273. Collector 271 is connected to negative voltage source 291 and emitter 270 is connected to terminal 282 via impedance 275. In this way, a complete d.c. path is provided from postive voltage source 290 through the collector-emitter path of transistor 263, impedance 273, the station connected between terminals 280 and 283, impedance 275 and the emitter-collector path of transistor 268. This d.c. path provides the operating current for the connected station. The base biasing for transistor 263 is provided from positive voltage source 290 through impedance 218, and the base biasing for transistor 268 is provided by negative voltage source 291 through impedance 219. Both transistors 263 and 268 are connected as emitter followers, well known in the art, so that the signal $-el\text{–}n$ applied from drain electrode 216 to base 265 is coupled through the base-emitter path of transistor 263 and impedance 273 to terminal 280. Similarly, the signal voltage $el\text{–}n$ is applied from source electrode 215 to base 269 and is coupled through the base-emitter path of transistor 268 and impedance 275 to terminal 282. In this way, a balanced signal is applied to the station connected to terminals 280 and 282 in response to the signal stored on storage capacitor 250. One terminal of capacitor 250 is connected to impedance 273 via normally closed IGFET switch 252 and the other terminal of capacitor 250 is connected to resistor 275 via normally closed IGFET switch 257. Where impedances 273 and 275 match the impedance presented by the connected station to terminals 280 and 282, the signal voltage stored in capacitor 250 responsive to the signal derived from storage capacitor 210 is $+el\text{–}n$. The balanced outgoing signal $el\text{–}l$ from station 1—1 is applied via terminals 280 and 282 and switches 252 and 257 to capacitor 250. Any longitudinal signal from the connected station is cancelled in capacitor 250.

At the beginning of time slot $ts2$, control signal A1 becomes positive, and control signal $\bar{A}1$ becomes negative. In response to negative control signal $\bar{A}1$, normally closed IGFET switches 222, 252, 257 and 247 are rendered nonconductive so that capacitor 260 is disconnected from drain electrode 216, and capacitor 250 is disconnected from impedances 273 and 275 as well as terminals 280 and 282. Control signal A1 is made positive whereby normally open switches 231, 235, 203 and 208 are rendered conductive. In this way, capacitor 260 is serially connected to one terminal of capacitor 250 through IGFET switch 231, and the other terminal of capacitor 250 is connected to gate electrode 294 through IGFET switch 235. The stored outgoing signal $el\text{–}l$ from capacitor 250 is applied to gate electrode 294 through IGFET switch 235. The series opposing connection between capacitors 260 and 250 insures that the signal on each one of these capacitors derived on the signal stored on capacitor 210 is not applied to gate 219. The outgoing signal $el\text{–}l$ is coupled through the gate-source path of source follower 293 to source electrode 295 and is further coupled through now closed IGFET switch 208 and impedance 202 to terminal 284.

Since terminal 284 is connected to bus 186 in FIG. 1, the outgoing signal from the station circuit of FIG. 2 is applied to summing circuit 187 in FIG. 1 together with the signals from other similar selected station circuits. The resulting sum signal is applied from circuit 187 and bus 189 to the terminal of capacitor 210 connected to gate electrode 214 via IGFET switch 203. Capacitor 210 is operative to subtract the station outgoing signal $el\text{–}l$ applied to one terminal from the sum signal, e.g., $el\text{–}l + el\text{–}n$ applied to the other terminal. In this way, capacitor 210 stores a new sample of signal $el\text{–}n$ which is transferred to the capacitor during $ts2$. The signal stored on capacitor 210 is further coupled to the associated station as hereinbefore described.

During time slot $ts2$, serially connected storage capacitors 260 and 250 are coupled to terminal 284 via source follower 293. As is well known in the art, the input impedance to an IGFET source follower amplifier is very high. Thus capacitors 260 and 250 are not discharged through IGFET 293. In like manner, storage capacitor 210 is coupled to storage capacitors 250, 260 and terminals 280 and 282 via high input impedance IGFET 213 whereby capacitor 210 is not discharged between signal transfers. The signal transfer is accomplished through a sample and hold operation by the hereinbefore mentioned amplifier coupling arrangements. In this way, the sample signal transferred from terminal 283 in time slot *ts*2 is made available to the connected station for the interval between successive occurrences of time slot *ts*2 so that substantially all the signal energy incoming to the station circuit is transferred to the connected station. When a new sample is applied to a storage capacitor in the station circuit, the new sample completely replaces the sample previously stored therein and is held therein until the next selected time slot.

The d.c. path between emitters 266 and 270 is coupled through the station connected to terminals 280 and 282. There is a distinct voltage shift at terminals 280 and 282 when the connected station goes on-hook or goes off-hook due to the change in impedance between terminals 280 and 282. This voltage shift is stored in capacitor 250 whereby the hook state of the connected station may be detected on the common bus arrangement during the normal signal sampling process hereinbefore described.

Figure 3:
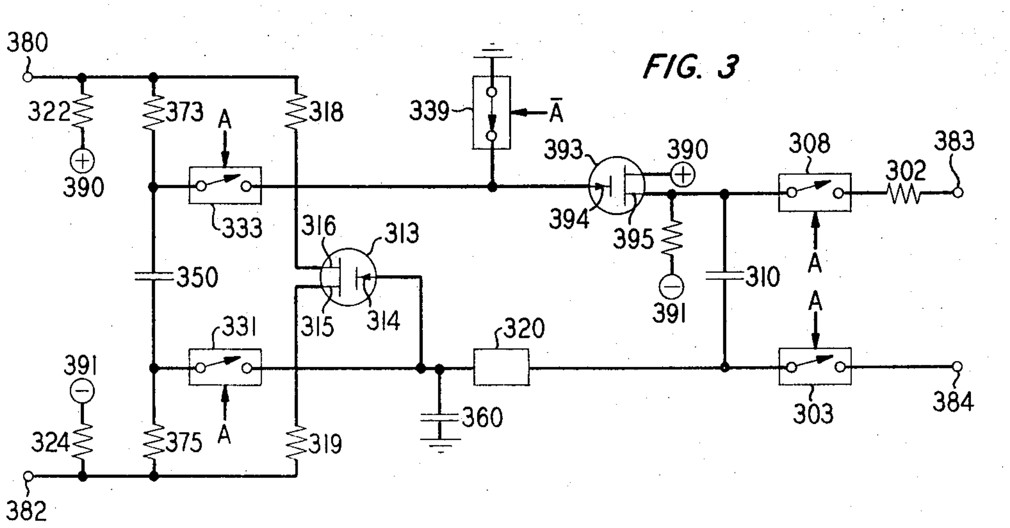
FIG. 3 shows another communication path circuit that may be used in the system of FIG. 1.

FIG. 3 shows another form of station circuit that may be used in any of the station circuits in FIG. 1. The switches shown in FIG. 3 may be n-enhancement IGFET devices as described with respect to FIG. 2. Normally open switches 303, 308, 331 and 333 are closed for the duration of the selected time slot *ts*2 and normally closed switch 339 is open for the duration of the selected time slot in response to control signals A and $\bar{A}$. The signal stored in capacitor 310 which corresponds to capacitor 110–1 of FIG. 1 is assumed to be *el–n* prior to a *ts*2 time slot and is transferred to storage capacitor 360 via device 320. Device 320 may be a switch closed only during time slot *ts*2 or an impedance selected to charge capacitor 360 at a rate which prevents any significant signal transfer to capacitor 360 during time slot *ts*2. In the interval between successive time slots *ts*2, the signal *el–n* is applied to gate electrode 314 of IGFET amplifier 313. Drain electrode 316 is connected to positive voltage source 390 via series connected impedances 322 and 318. Source electrode 315 is connected to negative voltage source 391 via series connected impedances 324 and 319. In this way, IGFET amplifier 313 is biased in its linear range of operation. Impedances 322 and 324 together with voltage sources 390 and 391 may, if desired, be located at a remote point. As is well known in the art with respect to IGFET amplifiers, the signal *–el–n* appears at drain electrode 316 in response to the signal *el–n* applied to gate electrode 314 and the signal *el–n* appears at source electrode 315 in response to the same signal applied to gate electrode 314. A portion of the signal *el–n* is applied to the connected station via terminal 380 and a portion of the signal *el–n* is applied to the connected station via impedance 319 and terminal 382. A portion of the signal *–el–n* is applied to one terminal of capacitor 350 through impedance 373, and a portion of the signal *el–n* is applied to the other terminal of capacitor 350 through impedance 375. Impedances 318, 373, 319, 375, 322 and 324 are selected so that the signal voltage *–el–n* is stored in capacitor 350. This signal voltage is equal and opposite in phase to the signal voltage stored in capacitor 350.

During time slot *ts*2, control signal A on FIG. 3 is positive whereby normally open switches 303, 308, 331 and 333 are closed. Control signal $\bar{A}$ on FIG. 3 opens normally closed switch 339. Capacitors 360 and 350 are connected in series through switch 331; and one terminal of capacitor 350 is connected to gate electrode 394 of source follower amplifier 393 through switch 333. In this way, the signal *el–l* from the connected station is coupled through source follower amplifier 393 to one terminal of capacitor 310 and is further coupled through switch 308, impedance 302 and terminal 383 to common bus 186 of FIG. 1. Since switch 303 is closed during time slot *ts*2, the signal from bus 189 is coupled from terminal 384 and switch 303 to the other terminal of storage capacitor 310. Device 320 is selected so that capacitor 360 does not receive any significant portion of the signals stored in capacitor 319 during time slot *ts*2. Thus, capacitor 310 is operative to subtract the station outgoing signal *el–l* from the sum signal *el–l* + *el–n* incoming from bus 189 via terminal 384. The resulting signal *el–n* stored in capacitor 310 is then transferred to the connected station as hereinbefore described.

Both the signal voltages and the d.c. voltage from the station connected to terminals 380 and 382 are transferred to and stored in capacitor 350. Thus, when the station connected between terminals 380 and 382 changes hook state, i.e., goes on-hook or goes off-hook, there is a significant change in the d.c. voltage coupled to capacitor 350 from the station. The d.c. voltage across capacitor 350 may be detected during a normal signal transfer in any time slot of the repetitive cycle as hereinbefore described. In this way, the hook state of the station can be determined via the common bus sampling arrangement.

Figure 4:
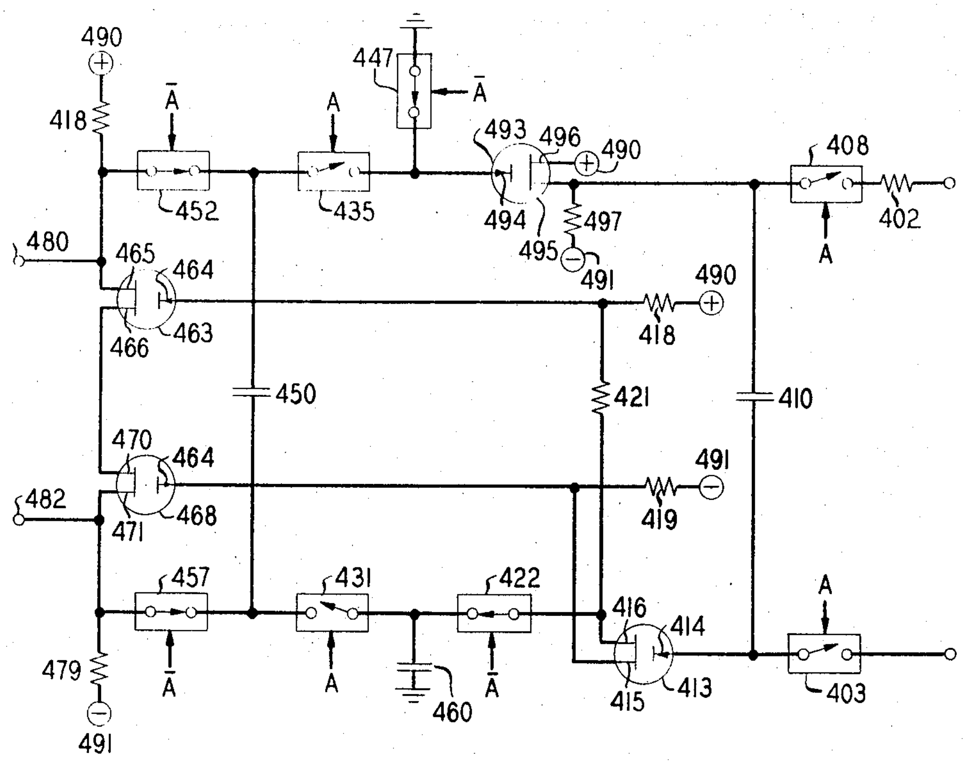
FIG. 4 shows another communication path circuit that may be used in the time division communication system of FIG. 1.

FIG. 4 shows yet another form of station circuit that may be used in any of the station circuits in FIG. 1. The switches shown in FIG. 4 may be of the n-enhancement type IGFET devices described with respect to FIG. 2. IGFET amplifiers 413, 463 and 493 are also n-enhancement devices while IGFET amplifier 468 is a p-type depletion device. Capacitors 410, 460 and 450 correspond to capacitors 110–1, 160–1 and 150–1 respectively in FIG. 1. It is assumed for pruposes of illustration that the circuit of FIG. 4 is associated with station 1—1, therein, and that capacitor 410 stores a signal *el–n* in the interval between two successive *ts*2 time slots. During this time interval, normally closed switch 447 provides a ground reference potential on gate electrode 494 of source follower 493 whereby source electrode 495 is placed at the voltage slightly less than ground reference potential. In this way, the terminal of capacitor 410 connected to source 495 is biased at a reference voltage and the signal on gate electrode 414 of amplifier 413 is referenced to this bias potential. Drain electrode 416 of IGFET amplifier 413 is connected to positive voltage source 490 via series connected impedances 418 and 421. Source electrode 415 is connected to negative voltage source 491 via impedance 419. Impedances 418, 421 and 419 are selected so that IGFET amplifier 413 operates in its linear range. Where the sum of impedances 418 and 421 is twice impedance 419, the signal –2*el–n* appears on drain electrode 416 in response to the signal *el–n* on gate electrode 414. Also, the signal *el–n* appears on source electrode 415. Drain electrode 416 is connected to one terminal of storage capacitor 460 via normally closed switch 422 so that the signal voltage $-2el-n$ transferred to and stored in capacitor 460.

N-enhancement IGFET 463 is serially connected to p-depletion IGFET 468 whereby there is a single current path through the drain-source paths of these IGFET devices. Drain electrode 465 is connected to positive voltage source 490 via impedance 478; source electrode 466 is connected directly to source electrode 470; and drain electrode 471 is connected to negative voltage source 491 via impedance 479. Impedances 478 and 479 are selected so that IGFETs 463 and 468 are biased in their linear ranges of operation. Advantageously, the source impedance for IGFET 463 consists of IGFET 468 and the impedances connected to the drain of IGFET 468. Similarly, the source impedance for IGFET 468 consists of IGFET 463 and the impedances connected to the drain of IGFET 463. Ideally, the sources of both IGFET 463 and 468 remain at a fixed d.c. voltage level. A change in current induced by a voltage change at one IGFET gate is supplied by the other IGFET because of the opposite voltage swing at the other IGFET gate. This provides a negative feedback mechanism through which the operation of IGFETs 463 and 468 is stabilized. In response to the signal voltage $-el-n$ applied to gate electrode 464 from the junction between impedances 418 and 421, the signal voltage $el-n$ appears at drain electrode 465 and is transmitted therefrom to the connected station via terminal 480 and to one terminal of capacitor 450 via normally closed switch 452. The voltage $el-n$ applied to gate electrode 469 from source electrode 415 causes a voltage $-el-n$ to appear at drain 471 and this voltage is transmitted to the connected station via terminal 482 and is further transmitted to the other terminal of storage capacitor 450 via normally closed switch 457. In this way, the signal stored in storage capacitor 410 is transmitted to the connected station and a signal voltage $2el-n$ is stored in storage capacitor 450. The signal $el-l$ outgoing from the connected station is applied to capacitor 450 via switches 452 and 457.

In the next occurring $ts2$ time slot, control signal A causes normally open switches 403, 408, 431 and 435 to close and control signal $\bar{A}$ causes normally closed switches 422, 447, 452 and 457 to open. Thus during this $ts2$ time slot, capacitor 460 is serially connected to capacitor 450 via now closed switch 431 and serially connected capacitors 460 and 450 are connected to gate electrode 494 of source follower 493 via now closed switch 435. Capacitor 460 is disconnected from drain electrode 416 because switch 422 is open and capacitor 450 is disconnected from the connected station and from drain electrodes 465 and 471 because switches 452 and 457 are open. The polarity of the signals stored in capacitors 460 and 450 are such that the sum of signals stored therein capacitor 410 is the station outgoing signal from capacitor 450. The station outgoing signal is applied from capacitor 450 to gate electrode 494. This outgoing station signal $el-l$ is coupled through the gate source path of IGFET 493 to source electrode 495 and therefrom to the one terminal of capacitor 410 and further through now closed switch 408 and impedance 402 to common bus 186 in FIG. 1. In this way, only the station outgoing signal is applied to bus 186. As hereinbefore described, the sum of selected station signals appears on bus 189 and this sum signal is applied via now closed switch 403 to the other terminal of capacitor 410. Capacitor 410 is operative to subtract the station outgoing signal from source electrode 495 from the sum signal applied via closed switch 403. Thus, at the end of time slot $ts2$ capacitor 410 stores the sum of the signals from the other selected stations.

The voltage placed on capacitor 450 from the connected station includes both the station outgoing signal and a d.c. voltage. This d.c. voltage is dependent on the hook state of the station. When there is a change in hook state, e.g., the station goes on-hook or goes off-hook, there is a significant change in the d.c. voltage scross capacitor 450 which change may be detected on the common bus arrangement of FIG. 1. In this way, the time division arrangements may include hook state detection for each station.

Figure 6:
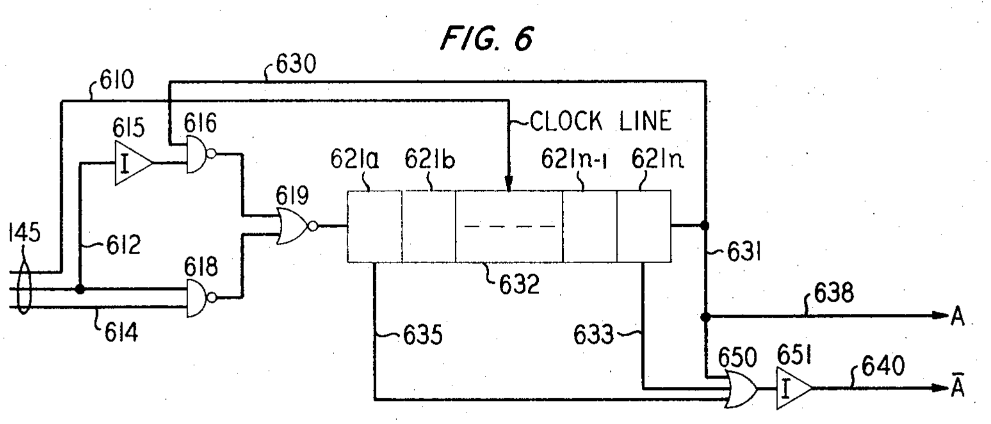
FIG. 6 shows a recirculating shift register circuit which may be used in the time division communication system of FIG. 1.

FIG. 6 shows a block diagram of a shift register arrangement that may be used as any of shift registers 111-1 through 111-$n$ in the time division system of FIG. 1. In FIG. 6, shift register 632 recirculates pulses entered through NOR gate 619 via the path including shift register 632, lead 630, NAND gate 616 and NOR gate 619. Each stage of the shift register provides a delay of one-half time slot and the total number of stages is equal to twice the number of time slots. A two-phase clock signal from cable 145 is obtained via clock line 610 and is applied to register 632 so that the information pulses in register 632 are shifted one stage at the termination of each half time slot period. A pulse in the shift register recirculation loop is made available to output lead 631 for the duration of one time slot in each repetitive cycle. This is done by inserting a pulse from cable 145 into two successive stages of the shift register. Any of the wellknown types of recirculating shift registers may be used. It is assumed for purposes of illustration that the shift register has been cleared prior to the setting up of a new interconnection and that the interconnection is set up in time slot $ts2$ in FIG. 5. The clearing of shift register 632 may be done in a repetitive cycle prior to the setting up of a connection by applying a positive signal to pulse inverter 615 from cable 145 via lead 612 for the duration of one repetitive cycle so that a negative signal is placed on one input to NAND gate 616 which negative signal blocks the recirculation of any pulses that may be present in the recirculating loop including shift register 632. It is to be understood that any method known in the art for clearing out pulses from a recirculating shift register may be used.

During the time slot selected for a particular connection including the station served by the shift register, a positive signal is applied from cable 145 via lead 612 to pulse inverter 615 and NAND gate 618. This enables NAND gate 618 for the duration of the time slot and disables gate 616 for the same period. An additional positive signal is placed on lead 614 for the duration of the time slot whereby gate 618 is opened and a negative signal is applied to one input of NOR gate 619. The other input to gate 619 is also held negative by the output of NAND gate 616. The negative signals from gates 618 and 616 result in a positive signal being present at the output of NOR gate 619 for the duration of the selected time slot. In this way, the positive signal from the output of NOR gate 619 is placed successively in stages 6021A and 6021B of shift register 632. At the end of the selected time slot, the signals from cable 145 are removed from lead 612 and the recirculation loop is reestablished.

As a result of the newly entered pulse into shift register 632, a positive output signal is obtained on lead 631 for the duration of the selected time slot *ts2* in each repetitive cycle. This positive output signal is available as control signal A during the selected time slots. Control signal A is shown in waveform 501. NOR gate 650 is supplied with signals from leads 633, 631 and 635. The signal on lead 633 is positive during the time slot prior to the selected time slot, the signal on lead 631 is positive during the selected time slot and the signal on lead 635 is positive during the time slot succeeding the selected time slot. As a result of the operation of NOR gate 650, a negative signal is obtained on lead 640 as indicated on waveform 503 of FIG. 5 which starts prior to the selected time slot and terminates after the selected time slot. This signal is used as control signal $\bar{A}$. Since control signal $\bar{A}$ controls the operation of the normally closed switches in the associated station circuit, this arrangement assures that the normally closed switches are always open when the normally opened switches are closed.

A circulating pulse may be removed from shift register 632 in the same manner as heretofore described for entering a pulse except that a negative signal is placed on lead 614 for the duration of the selected time slot whereby gate 618 is closed and a positive signal is applied to one input of NOR gate 619. This positive signal results in a negative signal being present at the output of NOR gate 619 for the duration of the selected time slot. In this way the pulses are eliminated successively in stages 6021A and 6021B of shift register 632.

What is claimed is:

1. In a time division communication system wherein a plurality of time slots occurs in repetitive cycles having at least one communication path, an incomming time division bus and an outgoing time division bus, a circuit for coupling signals between said communication path and said incoming and outgoing buses in a distinct time slot comprising first storing means, means for applying a signal from said incoming bus to said first storing means in said distinct time slot, second storing means, first means for coupling the signal in said first storing means to said second storing means, second means connected between said first coupling means and said communication path for coupling the signal from said first coupling means to said communication path, third storing means connected to said communication path and to said second coupling means for storing the coupled first storing means signal and the signal outgoing from said communication path, means operative in said distinct time slot for serially connecting said second and third storing means to cancel the coupled first storing means signal in said second storing means with the coupled first storing means signal in said third storing means, and third means operative in said distinct time slot for coupling the communication path outgoing signal from said connected second and third storing means to said outgoing bus.

2. In a time division communication system wherein a plurality of time slots occurs in repetitive cycles having at least one communication path, an incoming time division bus and an outgoing time division bus, a circuit according to claim 1 further comprising means for coupling the communication path outgoing signal from said outgoing bus to said incoming bus and means connected between said third coupling means and said first storing means for applying the communication path outgoing signal from said third coupling means to said first storing means, said first storing means comprising means operative in said distinct time slot for sbutracting the communication path outgoing signal applied from said third coupling means from the signal applied from said incoming bus.

3. In a time division communication system wherein a plurality of time slots occurs in repetitive cycles having at least one communication path, an incoming time division bus and an outgoing time division bus, a circuit according to claim 1 further comprising means operative in said distinct time slot for disconnecting said second storing means from said first coupling means, and means operative in said distinct time slot for disconnecting said third storing means from said second coupling means.

4. A time division communication system wherein a plurality of time slots occurs in repetitive cycles comprising a plurality of communication paths, first and second common buses, means for generating a control signal, each communication path having an associated circuit including first storing means responsive to said control signal being applied to said associated circuit for storing a first signal from said first common bus, second storing means, first means normally connected between said first and second storing means for coupling the signal in said first storing means to said second storing means, second means for coupling the first storing means signal from said first coupling means to said associated communication path, third storing means normally connected to said second coupling means and to said associated communication path for storing the coupled first storing means signal and the signal outgoing from said communication path, means responsive to said control signal being applied to said associated circuit for serially connecting said second and third storing means to cancel the first storing means signal in said second storing means with the first storing means signal in said third storing means, means responsive to said control signal being applied to said associated circuit for coupling the communication path outgoing signal from said series connected second and third storing means to said second common bus, means connected from said third coupling means to said first storing means for applying said stored communication path outgoing signal to said first storing means, and means for exchanging signals among a plurality of selected communication path circuits in a distinct time slot comprising means for applying said control signal to each selected communication path circuit in said distinct time slot and means connected from said second bus to said first bus responsive to the communication path outgoing signals from said selected communication path circuits on said second bus for producing a signal corresponding to the sum of said communication path outgoing signals and for applying said produced signal as said first signal to said first common bus in said distinct time slot.

5. A time division communication system according to claim 4 further comprising means responsive to said control signal for disconnecting said second storing means from said first coupling means and for disconnecting said third storing means from said second coupling means.

6. A time division communication system wherein a plurality of time slots occurs in repetitive cycles according to claim 5 wherein said producing means comprises a circuit for summing the selected communication path outgoing signals in said distinct time slot and means for applying the sum of said selected communication path outgoing signals to said first common bus.

7. A time division communication system wherein a plurality of time slots occurs in repetitive cycles according to claim 5, and wherein said first storing means comprises means for subtracting the stored communication path outgoing signal from the first signal.

8. A time division communication system wherein a plurality of time slots occurs in repetitive cycles according to claim 5 wherein said control signal generating means comprises a control circuit including means for producing control codes and a plurality of registers, each register being connected to a corresponding communication path circuit and comprising means for receiving a control code corresponding to a selected connection in said distinct time slot from said control circuit, means for storing said control code, and means responsive to said stored control code for generating and applying a control signal to the connected communication path circuit in the distinct time slot of each repetitive cycle.

9. A time division communication system wherein a plurality of time slots occurs in repetitive cycles according to claim 8 wherein said register receiving means comprises means for inserting a pulse into said register in said distinct time slot of a repetitive cycle prior to the transfer of signals between said selected stations, said register storing means comprises means for recirculating said inserted pulse once in each repetitive cycle, and said register generating and applying means comprises means responsive to said recirculated pulse for applying a pair of control pulses to said communication path circuit in the distinct time slot of each repetitive cycle.

10. A time division communication system wherein a plurality of time slots occurs in repetitive cycles comprising a plurality of stations, first and second common buses, means for generating control signals, each station having an associated circuit including first, second and third storage capacitors, means responsive to a control signal from said generating means for applying a first signal from said first common bus to said first storage capacitor, first means for coupling said first storage capacitor signal from said first storage capacitor to said second storage capacitor including first switching means normally connected to said second storage capacitor, second means for coupling said first storage capacitor signal from said first coupling means to said associated station and to said third storage capacitor and for coupling the associated station outgoing signal to said third storage capacitor, said second coupling means including second switching means normally connected to said third storage capacitor, said first and second switching means being operative in response to said control signal to disconnect said second storage capacitor from said first coupling means and to disconnect said third storage capacitor from said second coupling means, fourth switching means responsive to said control signal for serially connecting said second and third storage capacitors to cancel the signal stored in said second and third storage capacitor derived from said first storage capacitor signal, third means responsive to said control signal for coupling said station outgoing signal in said serially connected second and third storage capacitors to said second common bus, and means for exchanging signals among a plurality of selected station circuits in a distinct time slot comprising means for applying said control signal to said selected station circuits in said distinct time slot, means connected from said second common bus to said third common bus for summing the station outgoing signals on said second common bus in said distinct time slot and means for applying said summing means output to said first common bus as said first signal in said distinct time slot.

11. A time division communication system according to claim 10 wherein each storage capacitor includes first and second terminals, said first coupling means comprises a first amplifier having an input and first and second outputs, said amplifier being operative in response to a signal on said input to provide equal and opposite phase signals on said first and second outputs, said first amplifier input being connected to said first storage capacitor first terminal, said first storage capacitor second terminal being connected to said third coupling means, said first amplifier first output being connected to said second storage capacitor first terminal via said first switching means, and said second storage capacitor second terminal being connected to a reference potential.

12. A time division communication system according to claim 11 wherein each of said stations has two terminals, said second coupling means comprises a second amplifier having first and second inputs and first and second outputs, said second amplifier first input being connected to said first amplifier first output, said second amplifier second input being connected to said first amplifier second output, said second amplifier first output being connected to one terminal of said associated station and being further connected to said third storage capacitor first terminal via said second switching means, said second amplifier second output being connected to the other terminal of said associated station and being further connected to said third storage capacitor second terminal via said second switching means.

13. A time division communication system according to claim 12 wherein said third coupling means comprises a third amplifier having an input connected to said third storage capacitor first terminal and an output, an impedance having one terminal connected to said second common bus and a fifth switching means connected between said third amplifier output and the other terminal of said impedance.

14. A time division communication system according to claim 10 wherein each station has two terminals, each storage capacitor includes first and second terminals, said first switching means comprising first and second switching devices, and said first coupling means comprises a first amplifier having an input and first and second outputs, said amplifier being operative in response to a signal on said input to provide equal and opposite phase signals on said first and second outputs, said first amplifier input being connected to said first storage capacitor first terminal, said first storage capacitor second terminal being connected to said third coupling means, said first switching device being responsive to said control signal to connect said first amplifier first output to said second storage capacitor first terminal, said second switching device being responsive to said control signal to connect said first amplifier second output to said second storage capacitor second terminal.

15. A time division communication system according to claim 14 wherein said second switching means comprises third and fourth switching devices, said second coupling means comprises a second amplifier having first and second inputs and first and second outputs, said second amplifier first input being connected to said first amplifier first output, said second amplifier second input being connected to said first amplifier second output, said second amplifier first output being connected to one terminal of said associated station and being further connected to said third storage capacitor first terminal via said third switching device, said second amplifier second output being connected to the other terminal of said associated station and being further connected to said third storage capacitor second terminal via said fourth switching device.

16. A time division communication system according to claim 15 wherein said fourth switching means comprises fifth and sixth switching devices, said fifth switching device being responsive to said control signal to connect said third storage device first terminal to a reference potential; said sixth switching device being responsive to said control signal for connecting said third storage capacitor first terminal to said second storage capacitor first terminal, and said third coupling means comprising a third amplifier having an input and an output, said third amplifier input being connected to said second storage capacitor second terminal, an impedance having one terminal connected to said second common bus, and fifth switching means responsive to said control signal for connecting said third amplifier output to the other terminal of said impedance.

17. A time division communication system according to claim 11 wherein said second switching means comprises first and second switching devices, said second coupling means comprises a second amplifier having first and second inputs and first and second outputs, said second amplifier first input being connected to said first amplifier first output, said second amplifier second input being connected to said first amplifier second output, said second amplifier first output being connected to one terminal of said associated station and being further connected to said third storage capacitor first terminal via said first switching device, said second amplifier second output being connected to the other terminal of said associated station and being further connected to said third storage capacitor second terminal via said second switching device.

18. A time division communication system according to claim 17 wherein said second amplifier comprises a pair of opposite conductive type IGFET devices, each having a gate electrode, a source electrode and a drain electrode, one IGFET device gate electrode being the second amplifier first input, the other IGFET device gate electrode being the second amplifier input, the one IGFET device drain electrode being said second amplifier first output, the other IGFET device drain electrode being said second amplifier second output and the one IGFET device source electrode directly connected to the other IGFET device source electrode.

19. A time division communication system according to claim 18 wherein said fourth switching means comprises third and fourth switching devices, said third switching device being responsive to said control signal for connecting said second storage capacitor first terminal to said third storage capacitor second terminal, said third coupling means comprising a third amplifier having an input and an output, said fourth switching device being responsive to said control signal for connecting said third amplifier input to said third storage capacitor first terminal, an impedance having one terminal connected to said second common bus and fifth switching means responsive to said control signal for connecting said third amplifier output to the other terminal of said impedance.

20. A time division communication system wherein a plurality of time slots occurs in repetitive cycles, comprising a plurality of stations, first and second common buses, means for generating a control signal, each station having an associated circuit including first, second and third stores, means responsive to a control signal from said generating means for applying a signal from said first common bus to said first store, first means for coupling the signal in said first store to said second store, second means for coupling the first store signal from said first coupling means to said associated station and to said third store whereby the first store signal is transferred to said third store and said associated station and the signal outgoing from said associated station is transferred to said third store, means responsive to said control signal for serially connecting said second and third stores, and third coupling means responsive to said control signal for coupling said outgoing station signal from said serially connected second and third stores to said second common bus, and means for exchanging signals among a plurality of stations in a distinct time slot comprising means for applying said control signal to each selected station circuit in a distinct time slot, and means connected between said second and first common buses for summing the outgoing station signals from said selected stations on said second bus and for applying the resulting sum signal to said first common bus whereby the sum signal is applied to each selected station first store.

21. A time division communication system according to claim 20 further comprising means for connecting said third coupling means to said first store, said first store comprising means for subtracting the station outgoing signal from said third coupling means from the sum signal applied to said first store from said first common bus.

22. A time division communication system according to claim 21 wherein each of said first, second and third stores comprises a storage capacitor having first and second terminals, said first coupling means comprises a coupling device connected between said first storage capacitor first terminal and said second storage capacitor first terminal, said second storage capacitor second terminal being connected to a reference potential, said second coupling means comprising a first amplifier having an input and first and second outputs, said first amplifier being responsive to the signal applied to said input for producing equal and opposite phase signals on said first and second outputs, means for coupling said first and second outputs to said associated station and to said third storage capacitor first and second terminals, said serially connected means comprising first and second switching devices, said first switching device being responsive to said control signal for connecting said second storage capacitor first terminal to said third storage capacitor second terminal, said second switching device being responsive to said control signal for connecting said third storage capacitor first terminal to the input of said second amplifier and said third coupling means further comprising an impedance having one terminal connected to said second common bus, a third switching device responsive to said control signal for connecting said second amplifier output to the other terminal of said impedance, and said means for connecting the third coupling means to said first store comprising means for connecting said second amplifier output to the second terminal of said first store.

* * * * *